Oct. 28, 1969 J. S. KAMBORIAN Re. 26,700

METHOD OF LASTING A SHOE

Original Filed Aug. 16, 1961 5 Sheets-Sheet 1

INVENTOR.
Jacob S. Kamborian
BY Albert Gordon ATT'Y

METHOD OF LASTING A SHOE

Original Filed Aug. 16, 1961 5 Sheets-Sheet 2

METHOD OF LASTING A SHOE

Original Filed Aug. 16, 1961 5 Sheets-Sheet 3

METHOD OF LASTING A SHOE

Original Filed Aug. 16, 1961 5 Sheets-Sheet 4

United States Patent Office

Re. 26,700
Reissued Oct. 28, 1969

26,700
METHOD OF LASTING A SHOE

Jacob S. Kamborian, 70 Crestwood Road,
West Newton, Mass. 02165

Original No. 3,130,430, dated Apr. 28, 1964, Ser. No. 131,850, Aug. 16, 1961. Application for reissue Mar. 21, 1968, Ser. No. 719,788
Int. Cl. A43d *29/00*
U.S. Cl. 12—145 5 Claims

Matter enclosed in heavy brackets [ ] appears in the original patent but forms no part of this reissue specification; matter printed in italics indicates the additions made by reissue.

This invention relates to the wiping and attaching of all of the margin of a shoe upper to a shoe insole in three series of steps, first heel seat lasting the shoe, then toe lasting the shoe, and finally side lasting the shoe.

In the first series, an upper is provided having a pocket at its heel that receives a thermoplastic counter coated on its sides with a thermoplastic adhesive. The counter is rigid at ambient temperatures and becomes flaccid when heated above a predetermined temperature. The adhesive is rigid at ambient temperatures and becomes tacky when heated above said predetermined temperature. The upper, with the counter in the pocket, is heated above said predetermined temperature and is then draped about a last having an insole located on its bottom. The heel of the upper, and the counter are now stretched tightly about the last and the top line of the upper is pulled tautly on the last. While the upper and counter are so stretched and the upper is so pulled, the marging of the upper and counter at the heel of the last is wiped upon the insole. The pressures generated during wiping causes the counter to adhere to the wiped upper margin and the insole thereby adhesively attaching substantially all of the wiped upper margin to the insole.

In the second series, the toe of the upper is stretched tightly about the last and the top line of the upper is pulled tautly on the last. While the upper is so stretched and pulled, adhesive is deposited in the angle formed between the margin of the upper at the toe and the insole and the margin of the upper is wiped upon the insole. The pressures generated during the wiping causes substantially all of the wiped toe margin to adhere to the insole thereby adhesively attaching substantially all of the toe margin of the upper to the insole.

In the third series, the sides of the upper, intermediate the toe and heel, are stretched about the last and while so stretched are wiped upon the insole and adhesively attached to the insole.

These series of steps enables the upper to be completely lasted to the insole in an effective, simple and time saving manner without employing the separate pulling over and assembling operations heretofore found necessary.

The heel seat lasting may be performed by the machine displosed in [copending application Serial No. 107,156 filed May 2, 1961] *Patent No. 3,189,924*, in accordance with the method disclosed in [copending application Serial No. 80,919 filed January 5, 1961] *Patent No. 3,144,670*. In accordance with this method a counter is molded at the heel of the upper concomitantly with the heel seat lasting operation.

Figure 11:
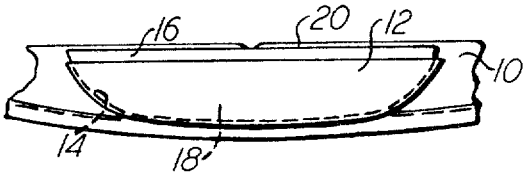
FIG. 11 is a detail of the counter inserted in the counter pocket of the upper.

The shoe upper 10 has a liner 12 stitched thereto at its heel by stitching 14 thereby forming a counter pocket that receives a counter 16 (FIG. 11). The counter, when in the counter pocket, has a concealed portion 18 lying within the counter pocket and an exposed margin 20 lying without the counter pocket substantially coextensively with the contiguous upper margin. The counter is composed of a homogeneous thermoplastic material that is rigid at ambient temperatures, becomes flaccid and moldable when heated above a predetermined temperature and returns to its original rigid state when cooled below said predetermined temperature. The counter is coated on both of its sides with a thermoplastic adhesive that is rigid at ambient temperatures and becomes tacky and adherent under pressure when heated above said predetermined temperature. Reference is made to the aforementioned [application Serial No. 80,919] *Patent No. 3,144,670* for an example of the composition of the counter and adhesive.

The assembled upper and counter are heated sufficiently to render the counter flaccid and the adhesive tacky in an apparatus such as that disclosed in [copending application Serial No. 90,874 filed February 21, 1961] *Patent No. 3,115,651*. The upper and counter are then draped about a last 22 which last is supported bottom-up on a last supporting plate 24 having a last pin 26 projecting upwardly thereof into the conventional last pin hole of the last. The last has an insole 28 located on its bottom, and a toe roller 30 is provided to support the vamp of the upper. The upper when placed on the last has the exposed counter portion 20 and the margin of the upper 10 extending upwardly of the last bottom at the heel of the last.

Figure 1A:
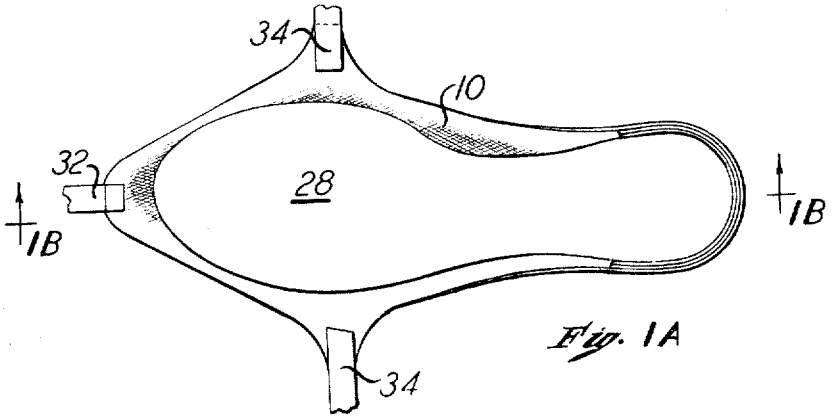
FIG. 1A is a plan view showing the shoe and last at the beginning of the first series of steps.
Figure 1B:
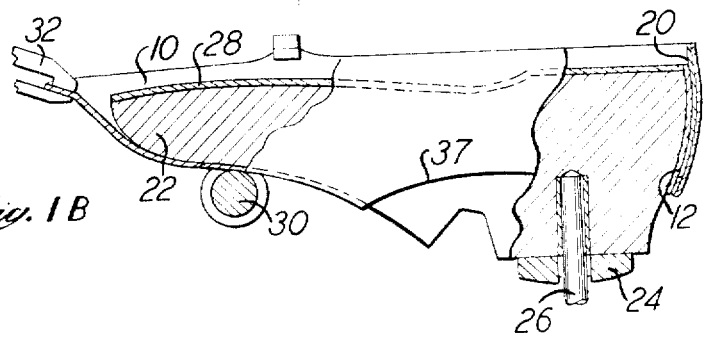
FIG. 1B is a view taken along the line 1B—1B of FIG. 1A.
Figure 2:
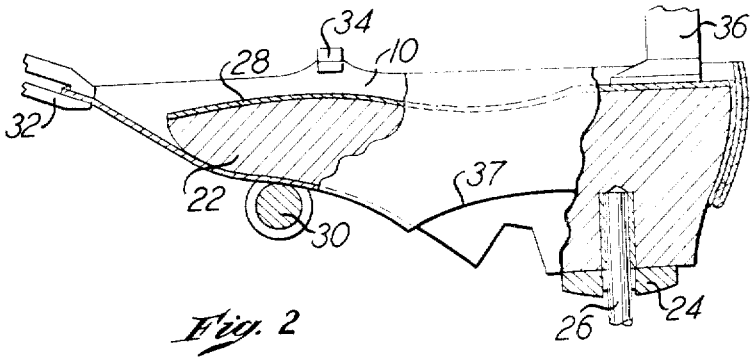
FIG. 2 is a view of the shoe and last with the heel of the upper and counter stretched about the last and the top line of the upper pulled tautly on the last.
Figure 3:
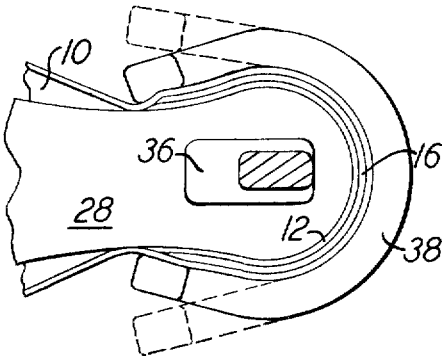
FIG. 3 is a plan view showing the clamping of the heel of the upper and the counter to the last prior to wiping the upper and counter margins at the heel upon the insole.
Figure 4:
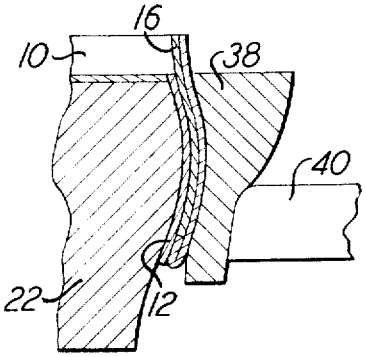
FIG. 4 is a detail showing a presser cooperative with the heel clamp to clamp the heel of the upper and counter against the last.
Figure 5A:
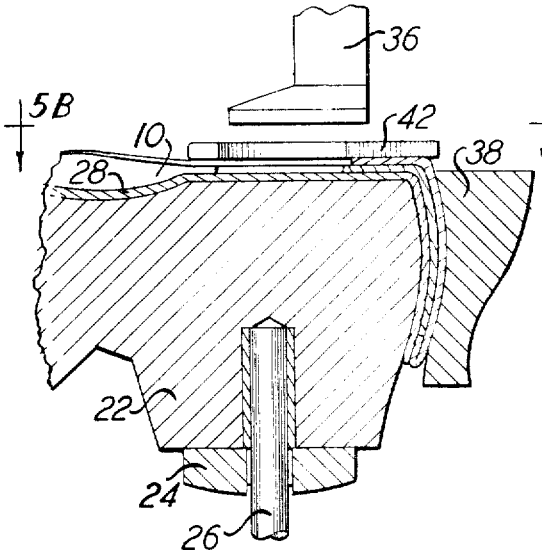
FIG. 5A is a showing of the shoe and last at the completion of the heel seat lasting operation.
Figure 5B:
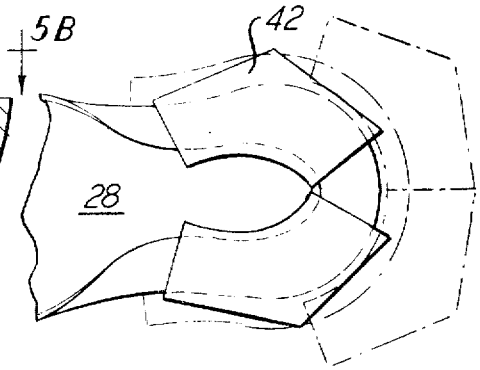
FIG. 5B is a view taken along the line 5B—5B of FIG. 5A.

The toe portion of the upper is now gripped by a toe pincers 32 and the forepart portions of the upper are gripped by a forepart pincers 34 as shown in FIGS. 1A and 1B, after which all three pincers are moved forwardly in unison to stretch the upper [end] *and* counter tightly about the heel of the last and tension mold the flaccid counter to the shape of the last. The last, pincers, and toe roller are now moved in unison beneath a hold-down foot 36 and then forced upwardly against the hold-down foot to clamp the shoe and last between the last support 24 and the hold-down foot 36. After this the pincers 32 and 34 are moved upwardly in unison to pull the topline 37 of the upper tautly on the last as shown in FIG. 2. The bight of a U-shaped heel clamping pad 38 is now moved against the heel end of the upper and the legs of the pad are then moved inwardly against the upper at the heel of the upper from the dotted to the solid line position of FIG. 3 to rigidly clamp the heel of the upper against movement on the last and to compression mold the flaccid counter to the shape of the last. A plurality of presser members 40 (FIG. 4) are brought to bear against the bottom of the pad 38 opposite the neck portion of the last that curves inwardly to ensure that all of the pad 38 is pressed against the upper and to ensure a molding of all of the counter to the shape of the last. Wipers 42 are now moved from the dotted to the solid line position of FIG. 5B to wipe the upwardly extending margins of the counter and upper down upon the insole. During the movement of the wipers, the hold-down foot 36 is raised so that the upward force exerted by the last support 24 causes the wiped in margin to bear directly against the bottoms of the wipers and create a bedding pressure between the wiper bottoms and the lasted margin. The pressures generated during the wiping and bedding operation causes the counter to be adhesively bonded to the upper and insole thereby adhesively uniting the upper and insole all around the heel. It is to be noted that all during the clamping and wiping operations the upper is maintained stretched about the heel of the last and the topline 37 is pulled tautly on the last under the tension forces applied by the pincers 32 and 34.

Figure 6A:
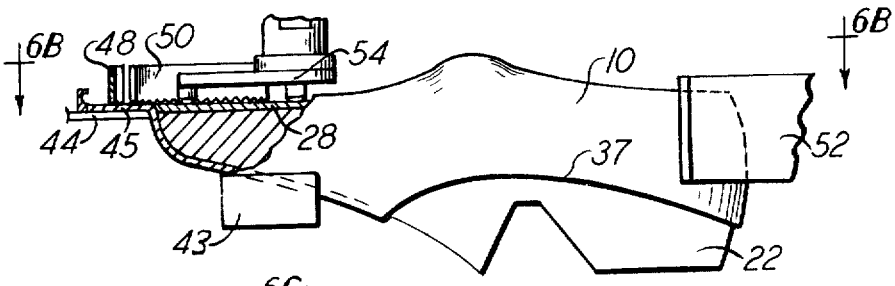
FIG. 6A is a side elevation of the shoe and last at the beginning of the second series of steps.
Figure 6B:
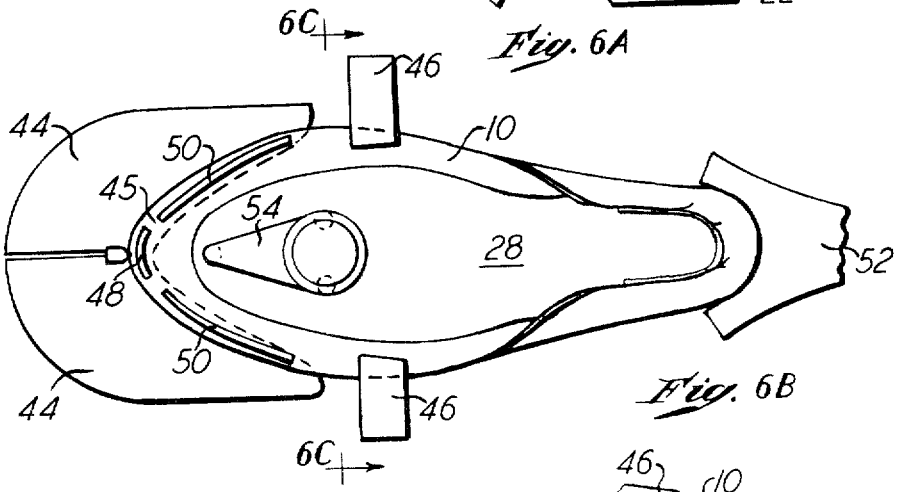
FIG. 6B is a view taken along the line 6B—6B of FIG. 6A.
Figure 6C:
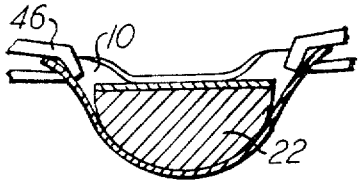
FIG. 6C is a view taken along the line 6C—6C of FIG. 6B.

The shoe and last are now released from the pincers 32, 34, the clamping pad 38 and the wipers 42 and are brought to a toe lasting station where a toe lasting mechanism such as that disclosed in [copending application Serial No. 100,979 filed April 5, 1961] *Patent No. 3,165,-771,* may be employed. The vamp of the upper and last is placed bottom-up on a toe pad 43 with the portion of the upper that extends in the direction of the toe from the now lasted heel draped loosely on the upper. The vertical position of the toe pad 43 is such that the upwardly facing surface of the insole 28 is approximately level with or somewhat above [toe] *the* upper surfaces of the wipers 44, which toe wipers are positioned in front of the last. The lasting margin 45 of the upper at the toe is now placed on top of the wipers and the forepart portions of the upper margin are placed between the open jaws of forepart pincers 46 that are located on each side of the last adjacent the forepart of the upper. A center retarder 48 and a pair of side retarders 50 are now moved down to press the toe portion of the upper margin against the wipers. The center retarder engages the upper at its toe end and the side retarders engage the upper rearwardly of the toe end on opposite sides of the toe end. At the same time as the retarders are brought to bear against the upper margin at the toe, the pincers 46 are closed to grip the upper at its forepart portions. A heel clamp 52 is now brought to bear against the heel of the upper and last and a toe clamp 54 is brought downwardly against the insole 28 adjacent the toe so that the parts assume the position shown in FIGS. 6A, 6B and 6C.

The toe clamp 54, toe pad 43 and heel clamp 52 are now caused to move downwardly in unison to a position where the upwardly facing surface of the insole 28 is located below the bottoms of the wipers 44 by an amount that is substantially equal to the thickness of the margin of the lasting margin 45 to the position shown in FIGS. 7A and 7B. During this movement, the margin of the upper is gripped by the retarders 48, 50 and the forepart pincers 46 to draft and stretch the upper about the toe of the last. The upper slips to some extent from beneath the retarder blades and from between the pincer jaws, but only after it has been pulled over the last and cannot be further stretched. Due to the location of the retarder jaws 48, 50 forwardly of the toe of the last, they will also exert a heel to toe pull on the last and pull the topline 37 tautly on the last. Since the upper has been bonded to the insole and substantially frozen to the last at the heel in the preceding operation, the retarders and pincers have to contend only with the portion of the upper that is forward of the heel in stretching and pulling the upper on the last.

Figure 7A:
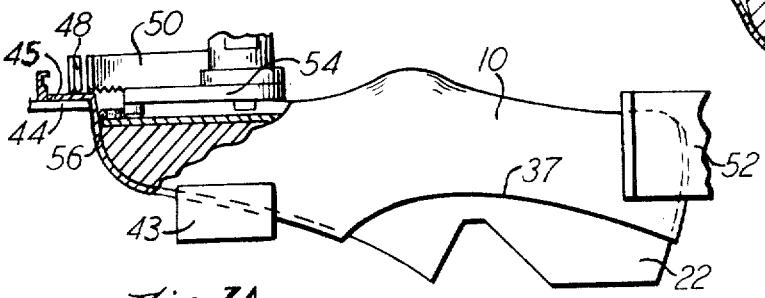
FIG. 7A is a view corresponding to FIG. 6A showing the shoe and last after the toe of the upper has been stretched tightly about the last and the top line has been pulled tautly on the last.
Figure 7B:
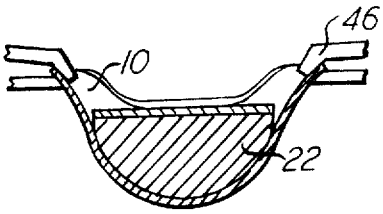
FIG. 7B is a view corresponding to FIG. 6C showing the toe of the upper stretched tightly about the last.
Figure 8A:
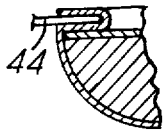
FIG. 8A is a side elevation partly in section of the toe of the shoe and last partway through the toe lasting operation.
Figure 8C:
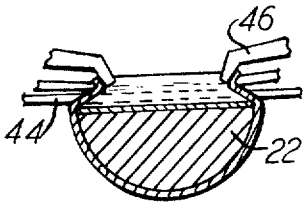
FIG. 8C is a view taken along the line 8C—8C of FIG. 8B.
Figure 8B:
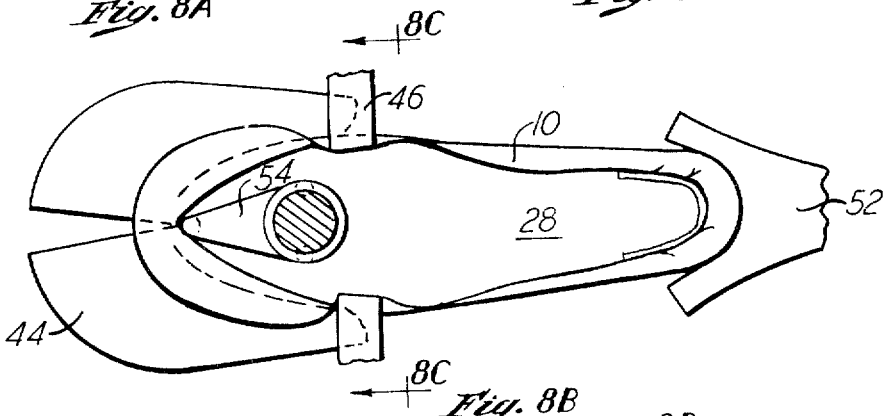
FIG. 8B is a plan view of the shoe and last partway through the toe lasting operation.
Figure 9A:
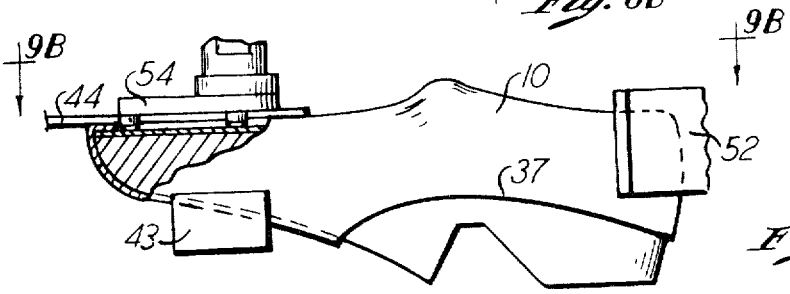
FIG. 9A is a side elevation view of the shoe and last at the completion of the toe lasting operation.
Figure 9B:
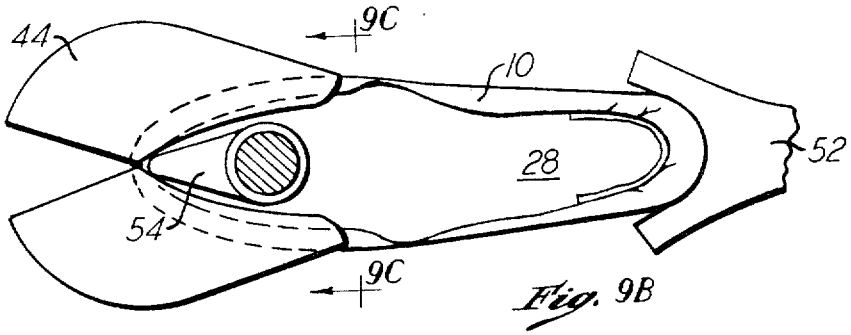
FIG. 9B is a view taken along the line 9B—9B of FIG. 9A.
Figure 9C:
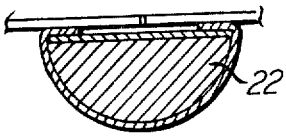
FIG. 9C is a view taken along the line 9C—9C of FIG. 9B.

A ribbon of adhesive 56 is now deposited in the angle between the upwardly extending lasting margin 45 and the insole 28 as indicated in FIG. 7A to enable the lasting margin and insole to be bonded to each other during the subsequently performed lasting operation. The adhesive may be deposited in conformance with the method described in Patent No. 2,969,555 with the adhesive applying apparatus described in [pending application Serial No. 68,546 filed November 10, 1960] *Patent No. 3,169,078.* The wipers 44 are now moved forwardly and toward each other in the conventional manner to wipe or fold the lasting margin 45 down against the insole 28 at the toe of the shoe. Concurrently with the initiation of the forward movement of the wipers, the heel clamp 52 is locked against movement to firmly hold the last in place during the wiping operation. At the same time as the wipers move forwardly, the forepart pincers 46 start moving inwardly toward each other. The pincers movement causes the upper margin at the forepart of the shoe to be layed in over the insole, as illustrated in FIGS. 8A, 8B and 8C so that the lasting margin wiped down on the insole by the wipers is of substantially uniform width. As the wipers 44 start their forward movement and engage the stretched lasting margin to force it down on the insole the retarders 48 and 50 are elevated to release their grip on the lasting margin and upward pressure is applied by the toe pad 43 to provide an overlasting pressure between the insole and the wiper bottoms. During the forward and inward movement of the wipers and the inward movement of the pincers the upper margin, after being stretched to its upmost, slips between the pincer jaws. This arrangement provides for a uniform pull on the margin along both sides of the shoe during the wiping operation. When the wipers have completed their forward stroke, the jaws of the pincers 46 are opened to release the upper margin and the pincers are moved outwardly to their original position, the heel clamp 52 is unlocked, and increased upward pressure is applied by the toe pad 43 against the last to apply bedding pressure between the wiper blades 44 and the [last] *lasting* margin of the upper and the insole to iron down the lasted margin. At this point the parts assume the position shown in FIGS. 9A, 9B and 9C. During the forward and inward movement of the wipers, the ribbon of adhesive 56 is squeezed [betwen] *between* the surfaces of the lasting margin and insole to form a film between the [last] *lasting* margin and insole which bonds the lasting margin to the insole under the pressures generated during wiping and the application of the overlasting and bedding pressures. It is to be noted that prior to the forward and inward movement of the wipers, the upper margin was stretched about the last and the top line 37 was pulled tautly on the last because of the action of the retarders 48, 50 and the pincers 46, and that the stretched and pulled condition was maintained during wiping due to the engagement of the lasting margin by the wipers as the retarders were released from the lasting margin, the overlasting pressure applied against the wipers and the inward movement of the pincers.

After the bedding pressure has been applied for a sufficient length of time, the toe pad 43 and heel clamp 52 are lowered to lower the shoe from the wipers 44, the wipers are retracted, the heel clamp is retracted, the toe clamp 54 is raised to starting position and the toe pad 43 and heel clamp 52 are elevated to starting position.

Figure 10:
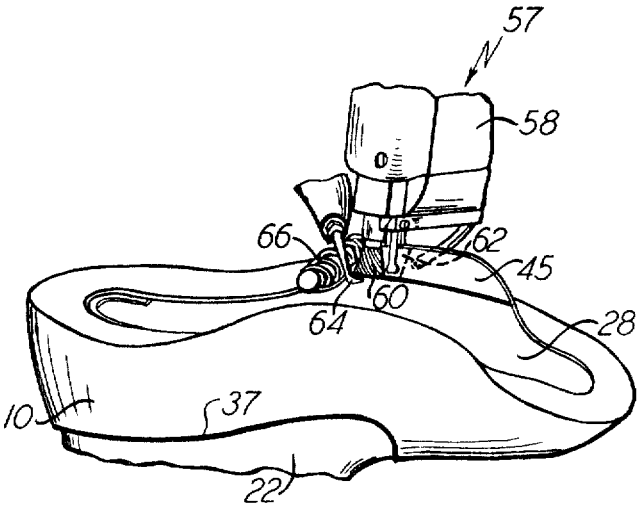
FIG. 10 is a showing of the wiping of a side of the upper.

The last and shoe are brought to a lasting machine 57 similar to that shown in Patent Nos. 2,667,908, 2,843,863 and [pending application Serial No. 112,417 filed May 24, 1961] *3,146,126,* where the remainder of the upper is lasted. As seen in FIG. 10, the machine comprises a head 58 which supports for rotation in opposite directions a pair of work gripping rolls 60 and 62 which are engageable with the opposite sides of the lasting margin of the upper 10. The roll 60 is tapered upwardly, the roll 62 is tapered downwardly, and both rolls are inclined to the vertical so as to produce an updrafting stress on the lasting margin 45 as it is advanced between the rolls as is customary in this type of machine. Adhesive is supplied to and discharged from the end of a nozzle 64, an end of which is located beneath the roll 60 and forwardly of the bite of the rolls to discharge the adhesive within the angle between the stressed lasting margin and the insole. A fixed wiper or folding blade (not shown) similar to the folding blade 26 shown in Patent No. 2,667,908 extends beneath the rolls 60, 62 to initiate the folding or wiping of the stressed lasting margin as it exists from the rolls. A rotatable wiper 66, having a helical rib on its periphery, serves to lay the stressed margin 45 onto the insole 28 and adhesively bond the margin to the insole.

The shoe is presented to the machine 57 to last the side portions of the upper extending between the now lasted heel and toe portions. An end of the course of a first one of the side portions of the upper margin 45 is presented between the feed rolls 60, 62 which grip the margin, exert a heightwise stress on the margin to stretch the upper including the topline 37 tightly on the last and at the same time feed the margin forwardly. The margin as it is fed forwardly has adhesive applied to it and to the insole by the nozzle 64 and is laid down while in stressed condition upon the insole by the wiper 66. This operation is repeated progressively and continuously on the entire course of the said first side portion of the margin and is then repeated on the course of the other side portion of the margin on the opposite side of the last. Since the toe and heel portions of the upper have previously been adhesively bonded to the insole and frozen to the last, the rolls 60, 62 do not pull up the heel and toe portions of the upper and only have to work against the side portions of the upper and thus can perform their function more effectively than if they had all of the upper to contend with.

The lasting of both side portions of the upper completes the lasting of the shoe and the shoe is now ready to have the next steps in its manufacture performed on it.

It should be understood that the present disclosure is for the purpose of illustration only and that this invention includes all modifications and equivalents which fall within the scope of the appended claims.

I claim:

[1. A method of lasting a shoe mounted on a last without removing the shoe from the last, said shoe comprising an insole located on the last bottom and an upper, having a margin that is to be attached to the insole, draped on the last, said method consisting of the steps of: stretching a first end of the upper tightly about the last; applying wiping means against a first portion of the margin at the first end of the upper to thereby wipe the first margin portion against the insole and permanently attaching substantially all of the wiped first margin portion to the insole while the upper is so stretched and while the wiping means are applied against the first margin portion; exerting a stress on the upper that includes a pull from the first end towards the second end of the upper to stretch the second end of the upper tightly about the last; applying wiping means against a second portion of the margin at the second end of the upper to thereby wipe the second margin portion against the insole and permanently attaching substantially all of the wiped second margin portion to the insole while the second end of the upper is so stretched and while the wiping means are applied against the second margin portion; and wiping the margins of the sides of the upper, intermediate the wiped first and second margin portions, against the insole and permanently attaching the wiped side margins to the insole while the sides of the upper are stretched about the last.]

[2. A method of lasting a shoe mounted on a last without removing the shoe from the last, said shoe comprising an insole located on the last bottom and an upper, having a margin that is to be attached to the insole, draped on the last, said method consisting of the steps of: stretching the upper tightly about the heel of the last; applying wiping means against the heel portion of the margin at the heel end of the upper to thereby wipe the heel portion of the margin against the insole and permanently attaching substantially all of the wiped heel portion of the margin to the insole while the upper is so stretched and while the wiping means are applied against the heel portion of the margin; exerting a stress on the upper that includes a pull from the heel of the upper towards the toe of the upper to stretch the toe end of the upper tightly about the last, applying wiping means against the toe portion of the margin at the toe end of the upper to thereby wipe the toe portion of the margin against the insole and permanently attaching substantially all of the wiped toe portion of the margin to the insole while the toe end of the upper is so stretched and while the wiping means are applied against the toe portion of the upper margin; and wiping the margins of the sides of the upper, intermediate the wiped heel and toe portions of the upper margin against the insole and permanently attaching the wiped side margins to the insole while the sides of the upper are stretched about the last.]

[3. A method of lasting a shoe mounted on a last without removing the shoe from the last, said shoe comprising an insole located on the last bottom and an upper, having a margin that is to be attached to the insole, draped on the last, said method consisting of the steps of: stretching a first end of the upper tightly about the last and pulling the top line of the upper tautly on the last; applying wiping means against a first portion of the margin at the first end of the upper to thereby wipe the first margin portion against the insole and permanently attaching substantially all of the wiped first margin portion to the insole while the upper is so stretched and pulled and while the wiping means are applied against the first margin portion; exerting a stress on the upper that includes a pull from the first end towards the second end of the upper to stretch the second end of the upper tightly about the last and pulling the top line of the upper tautly on the last; applying wiping means against a second portion of the margin at the second end of the upper to thereby wipe the second margin portion against the insole and permanently attaching substantially all of the wiped second margin portion to the insole while the second end of the upper is so stretched and pulled and while the wiping means are applied against the second margin portion; and wiping the margins of the sides of the upper, intermediate the wiped first and second margin portions, against the insole and permanently attaching the wiped side margins to the insole while the sides of the upper are stretched about the last.]

4. A method of lasting a shoe mounted on a last without removing the shoe from the last, said shoe comprising an insole *so* located on the last bottom *that its periphery is substantially coextensive with the periphery of the last bottom* and an upper, having a margin that is to be attached to the *bottom of the* insole, draped on the last, said method consisting of the steps of: stretching the upper tightly about the heel of the last and pulling the top line of the upper tautly on the last; applying wiping means against the heel portion of the margin at the heel end of the upper to thereby wipe the heel portion of the margin again the *bottom of the* insole and permanently attaching substantially all of the wiped heel portion of the margin to the *bottom of the* insole while the upper is so stretched and pulled and while the wiping means are applied against the heel portion of the margin; exerting a stress on the upper that includes a pull from the heel of the upper towards the toe of the uper to stretch the toe end of the upper tightly about the last and pulling the top line of the upper tautly on the last; applying wiping means against the toe portion of the margin at the toe end of the upper to thereby wipe the toe portion of the margin against the *bottom of the* insole and permanently attaching substantially all of the wiped toe portion of the margin to the *bottom of the* insole *exclusively* while the toe end of the upper is so stretched and pulled and while the wiping means are applied against the toe portion of the upper margin; and wiping the margins of the sides of the upper, intermediate the wiped heel and toe portions of the upper margin, against the *bottom of the* insole and permanently attaching the wiped side margins to the *bottom of the* insole while the sides of the upper are stretched about the last *by stresses which pull the sides of the upper margin away from the bottoms of the insole and the last.*

[5. A method of lasting a shoe mounted on a last without removing the shoe from the last, said shoe comprising an insole located on the last bottom and an upper, having a margin that is to be attached to the insole, draped on the last, said method consisting of the steps of: stretching a first end of the upper tightly about the last; applying wiping means against a first portion of the margin at the first end of the upper to thereby wipe the first margin portion against the insole and permanently and adhesively attaching substantially all of the wiped first margin portion to the insole while the upper is so stretched and while the wiping means are applied against the first margin portion; exerting a stress on the upper that includes a pull from the first end towards the second end of the upper to stretch the second end of the upper tightly about the last; applying wiping means against a second portion of the margin at the second end of the upper to thereby wipe the second margin portion against the insole and permanently and adhesively attaching substantially all of the wiped second margin portion to the insole while the second end of the upper is so stretched and while the wiping means are applied against the second margin portion; and wiping the margins of the sides of the upper, intermediate the wiped first and second margin portions, against the insole and permanently attaching the wiped side margins to the insole while the sides of the upper are stretched about the last.]

[6. The method according to claim 5 wherein the side margins are adhesively attached to the insole while said sides of the upper are stretched about the last.]

7. A method of lasting a shoe mounted on a last without removing the shoe from the last, said shoe comprising an insole *so* located on the last bottom *that its periphery is substantially coextensive with the periphery of the last bottom* and an upper, having a margin that is to be attached to the *bottom of the* insole, draped on the last, said method consisting of the steps of: stretching the upper tightly about the heel of the last [;] and pulling the top line of the upper tautly on the last; applying wiping means against the heel portion of the margin at the heel end of the upper to thereby wipe the heel portion of the margin against the *bottom of the* insole and permanently and adhesively attaching substantially all of the wiped heel portion of the margin to the *bottom of the* insole while the upper is so stretched and pulled and while the wiping means are applied against the heel portion of the margin; exerting a stress on the upper that includes a pull from the heel of the upper towards the toe of the upper to stretch the toe end of the upper tightly about the last and pulling the top line of the upper tautly on the last; applying wiping means against the toe portion of the margin at the toe end of the upper to thereby wipe the toe portion of the margin against the *bottom of the* insole and permanently and adhesively attaching substantially all of the wiped toe portion of the margin to the *bottom of the* insole *exclusively* while the toe end of the upper is so stretched and pulled and while the wiping means are applied against the toe portion of the upper margin; and wiping the margins of the sides of the upper, intermediate the wiped heel and toe portions of the upper margin, against the *bottom of the* insole and permanently attaching the wiped side margins to the *bottom of the* insole while the sides of the upper are stretched about the last *by stresses which pull the sides of the upper margin away from the bottoms of the insole and the last.*

8. The method according to claim 7 wherein the side margins are adhesively attached to the insole while said sides of the upper are stretched about the last.

9. A method of lasting a shoe mounted on a last without removing the shoe from the last, said shoe comprising an insole located on the last bottom and an upper, having a margin that is to be attached to the insole, draped on the last, said method consisting of the steps of: providing an upper having a pocket in its heel in which is received a counter coated on both of its sides with an adhesive, said counter being rigid at ambient temperatures and flaccid when heated above a predetermined temperature, and said adhesive being rigid at ambient temperatures and tacky when heated above said predetermined temperature; heating said counter above said predetermined temperature; draping the upper and counter about a last having an insole *so* located on its bottom *that its periphery is substantially coextensive with the periphery of the last bottom with the* [margins] *margin* of the upper at the heel and the margin of the counter extending away from the insole; stretching the upper and counter tightly about the heel of the last and pulling the top line of the upper tautly on the last; applying wiping means against the heel portion of the upper margin at the heel end of the upper and against the counter margin while the upper is so stretched and pulled to thereby wipe the heel portion of the upper margin and the counter margin against the *bottom of the* insole and adhesively and permanently attach substantially all of the wiped heel portion of the upper margin to the *bottom of the* insole through the adhesive on the counter while the wiping means are applied against the heel portion of the upper margin; exerting a stress on the upper that includes a pull from the heel of the upper towards the toe of the upper to stretch the toe end of the upper tightly about the last and pulling the top line of the upper tautly on the last; depositing adhesive in the angle formed between the margin of the upper and the insole at the toe of the last; while the toe end of the upper is so stretched and pulled, applying wiping means against the toe portion of the upper margin at the toe end of the upper to thereby wipe the toe portion of the upper margin against the *bottom of the* insole and adhesively and permanently attach substantially all of the wiped toe portion of the upper margin to the insole [throught] *through* the deposited adhesive while the wiping means are applied against the toe portion of the upper margin; and wiping the margins of the sides of the upper, intermediate the wiped heel and toe portions of the upper margin, against the *bottom of the* insole and permanently attaching the wiped side margins to the *bottom of the* insole while the sides of the upper are stretched about the last *by stresses which pull the sides of the upper margin away from the bottoms of the insole and the last.*

10. The method according to claim 9 wherein the side margins are adhesively attached to the insole while said sides of the upper are stretched about the last.

References Cited

UNITED STATES PATENTS

The following references, cited by the Examiner, are of record in the patented file of this patent or the original patent.

| | | | |
|---|---|---|---|
| 1,030,820 | 6/1912 | Keith | 12—8.3 X |
| 1,129,881 | 3/1915 | McFeely | 12—145 X |
| 1,135,951 | 4/1915 | McFeely | 12—145 |
| 2,150,892 | 3/1939 | DeLiso | 12—145 |
| 2,318,103 | 5/1943 | Russell et al. | 12—145 |
| 2,740,138 | 4/1956 | Quinn | 12—1 |
| 2,843,863 | 7/1958 | Weisz | 12—8.3 |
| 2,885,699 | 5/1959 | Ronza | 12—145 |
| 3,009,182 | 11/1961 | Kamborian | 12—145 |

PATRICK D. LAWSON, Primary Examiner